(12) United States Patent
Ding et al.

(10) Patent No.: US 9,504,859 B2
(45) Date of Patent: Nov. 29, 2016

(54) METHOD AND APPARATUS FOR INTEGRATING CHEMICAL AND ENVIRONMENTAL SENSORS INTO AN AIR PURIFICATION FILTER THROUGH A REUSABLE SENSOR PORT

(71) Applicant: Scott Technologies, Inc., Monroe, NC (US)

(72) Inventors: Frank Ding, Charlotte, NC (US); Amy E Quiring, Matthews, NC (US); Michael Parham, Weddington, NC (US)

(73) Assignee: Scott Technologies, Inc., Monroe, NC (US)

( * ) Notice: Subject to any disclaimer, the term of this patent is extended or adjusted under 35 U.S.C. 154(b) by 595 days.

(21) Appl. No.: 13/760,298

(22) Filed: Feb. 6, 2013

(65) Prior Publication Data
US 2013/0146052 A1    Jun. 13, 2013

Related U.S. Application Data

(63) Continuation of application No. PCT/US2011/046199, filed on Aug. 2, 2011.

(60) Provisional application No. 61/434,755, filed on Jan. 20, 2011, provisional application No. 61/371,427, filed on Aug. 6, 2010.

(51) Int. Cl.
*A62B 7/10* (2006.01)
*A62B 9/02* (2006.01)
(Continued)

(52) U.S. Cl.
CPC ............. *A62B 9/006* (2013.01); *A62B 7/10* (2013.01); *A62B 9/02* (2013.01); *A62B 18/02* (2013.01); *A62B 18/088* (2013.01); *A62B 18/10* (2013.01);
(Continued)

(58) Field of Classification Search
CPC .......... B01D 46/0086; B01D 46/2411; B01D 46/429; B01D 46/444; B01D 46/448; B01D 46/46; B01D 53/0454; A62B 7/10; A62B 9/02; A62B 9/006; A62B 18/02; A62B 18/088; A62B 18/10; A62B 19/00; A62B 23/02
See application file for complete search history.

(56) References Cited

U.S. PATENT DOCUMENTS 1,537,519 A * 5/1925 Yablick .................. 422/119
3,200,387 A * 8/1965 Loscher ................... 96/417
(Continued)

FOREIGN PATENT DOCUMENTS

JP    2004-275638 A    10/2004

*Primary Examiner* — Lynne Anderson
*Assistant Examiner* — Kathryn E Ditmer
(74) *Attorney, Agent, or Firm* — Joseph M. Butscher; The Small Patent Law Group, LLC

(57) ABSTRACT

A sensor device is disclosed for providing end of service life indication for an air purification filter. The sensor device has a cylindrical housing for insertion into a sorbent bed of a filter, and can be removed from the bed and reused at the end of the filter service. One or more sensors inside the housing are configured to sense physical/chemical characteristics of air passing through the sorbent bed, and to provide associated data to a sensor conditioning board within the housing. The sensor conditioning board processes the received data and conditions the data as desired. The housing is receivable in a cavity formed in the filter bed. A receiving structure receives the housing therein. Data from the one or more sensors can be used to calculate predicted end of service life of the filter. Other embodiments are described and claimed.

16 Claims, 9 Drawing Sheets

(51) Int. Cl.
  *A62B 18/02* (2006.01)
  *A62B 18/08* (2006.01)
  *A62B 19/00* (2006.01)
  *A62B 23/02* (2006.01)
  *A62B 9/00* (2006.01)
  *B01D 46/00* (2006.01)
  *B01D 46/24* (2006.01)
  *B01D 46/42* (2006.01)
  *B01D 46/44* (2006.01)
  *B01D 46/46* (2006.01)
  *B01D 53/04* (2006.01)
  *A62B 18/10* (2006.01)

(52) U.S. Cl.
  CPC ............... *A62B 19/00* (2013.01); *A62B 23/02* (2013.01); *B01D 46/0036* (2013.01); *B01D 46/0086* (2013.01); *B01D 46/2411* (2013.01); *B01D 46/429* (2013.01); *B01D 46/444* (2013.01); *B01D 46/448* (2013.01); *B01D 46/46* (2013.01); *B01D 53/0454* (2013.01)

(56) References Cited

U.S. PATENT DOCUMENTS

| | | | |
|---|---|---|---|
| 4,684,380 A | | 8/1987 | Leichnitz |
| 4,873,970 A | * | 10/1989 | Freidank et al. ........ 128/202.22 |
| 5,303,701 A | | 4/1994 | Heins et al. |
| 5,666,949 A | * | 9/1997 | Debe et al. ............. 128/202.22 |
| 6,040,777 A | * | 3/2000 | Ammann et al. ............. 340/632 |
| 6,537,347 B2 | * | 3/2003 | Motouji et al. ..................... 95/8 |
| 7,442,237 B1 | | 10/2008 | Gardner |
| 2009/0056536 A1 | * | 3/2009 | Wright ............... 95/25 |
| 2010/0153023 A1 | * | 6/2010 | Parham et al. ................. 702/34 |
| 2010/0284010 A1 | * | 11/2010 | Duncan et al. ............... 356/432 |

\* cited by examiner

METHOD AND APPARATUS FOR INTEGRATING CHEMICAL AND ENVIRONMENTAL SENSORS INTO AN AIR PURIFICATION FILTER THROUGH A REUSABLE SENSOR PORT

CROSS-REFERENCE TO RELATED APPLICATIONS

This application is a continuation of International Patent Application No. PCT/US2011/046199 filed Aug. 2, 2011, which claims the benefit of U.S. Provisional Patent Application No. 61/434,755, filed Jan. 20, 2011, and U.S. Provisional Patent Application No. 61/371,427, filed Aug. 6, 2010, all of which are incorporated herein by reference in their entirety.

FIELD OF THE DISCLOSURE

The present disclosure relates to a method of integrating chemical and environmental sensors into an air purifying filter as an End-of-Service-Life-Indicator (referred to as ESLI hereafter) and/or Residual-Life-Indicator (referred to as RLI hereafter), and more particularly to a sensor post structure for hosting a plurality of sensors that provide residual life indication and end of service life indication for an air purifying cartridge.

BACKGROUND OF THE DISCLOSURE

Air purifying filters typically do not have an unlimited service life. End users of air purifying devices must manage cartridge change-out using objective information, data, or an end of service life indicator (ESLI). ESLIs can provide important safety information to users of an air purifying apparatuses, particularly where the purifying device is being used to remove toxic gases from the air being breathed. Commonly used approaches to ESLI include passive and active solutions. Active solutions often involve the use of electronic chemical sensors that are integrated into the sorbent bed of the filter. Placing chemical sensors within the sorbent bed is problematic, however, because the sensors can undesirably disturb air flow in the filter. As a result, the sensor may not detect actual impurity concentration for a majority of the air stream, which can result in false signals. In addition, the presence of the sensor inside the adsorbent bed may adversely affect the air purification outcome and results in shorter service life time of the filter cartridge.

Furthermore, an embedded sensor approach requires that the sensor be disposed along with the cartridge when the service life of the cartridge ends, which greatly increases costs. Embedding a sensor in the sorbent bed also can increase the chance of improper bed packing. Further, it may be technically challenging to mount multiple sensors at various bed locations.

Accordingly, there is a need for an improved sorbent bed-embedded sensor design for use in air purifying filter apparatuses.

SUMMARY OF THE DISCLOSURE

A device and method are disclosed for embedding a chemical sensor inside the sorbent bed of a filter to provide information on the condition and usefulness of a filter used in a toxic environment. The design includes a device and method for either disposable or non-disposable chemical sensors to provide enhanced reliability sensor technology.

A sensor device is disclosed for filter end of service life indication. The design may include a sensor post housing for insertion into a sorbent bed of a filter cartridge. A chemical sensor may be disposed inside the sensor post housing. A sensor conditioning board, powered by a power supply, may be provided for conditioning and controlling the sensor and processing sensor data associated with the sensor post housing. The sensor post housing may be positioned within a cavity formed in the filter bed. In one embodiment, the sensor device includes a receiving structure that is placed in the filter bed cavity for inserting the sensor post housing therein. The sensor device is particularly useful as a proactive ESLI.

A method is disclosed for monitoring the end of service life of a filter using the above described sensor device. In one embodiment, the method includes attaching the sensor post housing to an inhalation valve support of a respirator or blower, and inserting the sensor post housing into a receiving structure to attach the filter to a mask. This can allow the opening of the sensor to align with the opening of the sensor post housing.

The disclosed method and device can be particularly useful as a proactive ESLI for an air purification filter. The benefits of providing such a proactive end of service life indicator are that residual life indication (i.e., time remaining to breakthrough) can be provided much earlier than the actual contaminant breakthrough time. This can provide a user with a much bigger safety margin to wrap up work tasks safely prior to requiring evacuation of a contaminated area.

BRIEF DESCRIPTION OF THE DRAWINGS

By way of example, a specific embodiment of the disclosed device will now be described, with reference to the accompanying drawings, in which.

DETAILED DESCRIPTION OF THE INVENTION

Figure 1A:
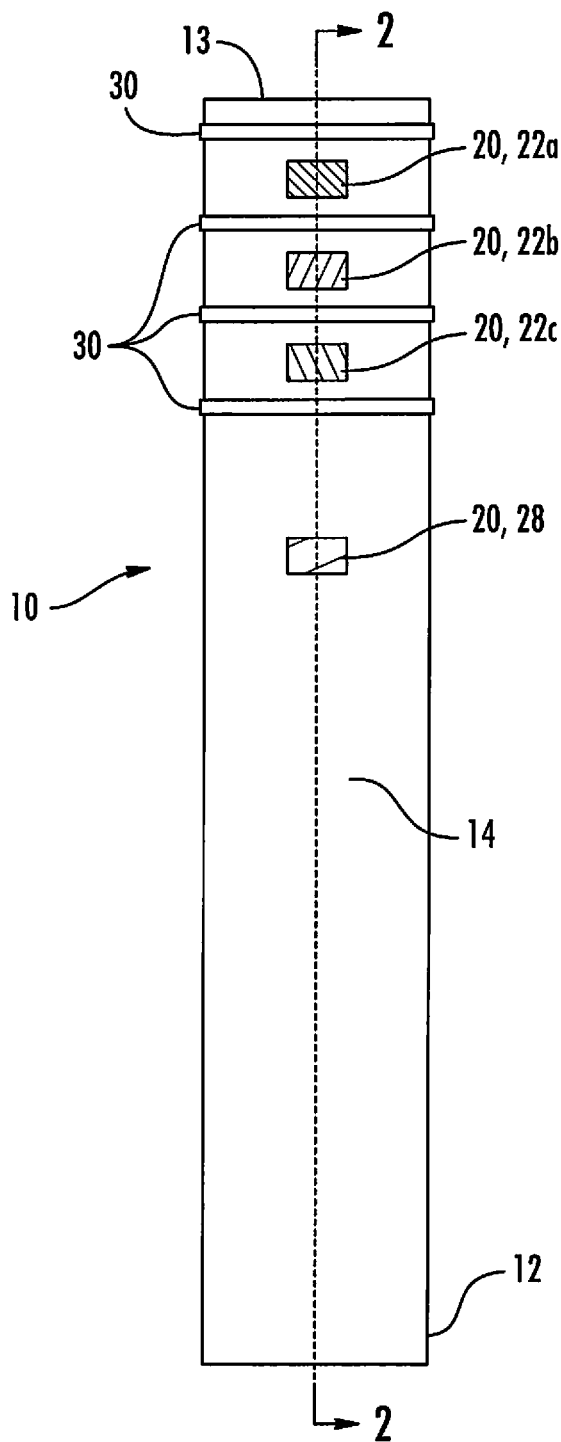
FIG. 1A is a side view of an exemplary embodiment of the disclosed sensor post.
Figure 1B:
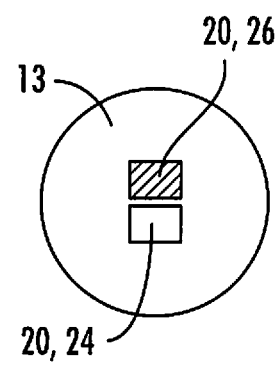
FIG. 1B is a top plan view of the sensor post of FIG. 1A.

A device and method are disclosed for providing reusable sensors within a sorbent bed of an air purifying cartridge. Referring to FIG. 1A, the device may be a sensor device, or post, 10 having a hollow cylindrical sensor post housing 14 that supports a plurality of different types of sensors 20 that may be mounted at a variety of positions along the housing 14. In one embodiment, the housing 14 can be mounted to a filter cartridge 60 (FIG. 4) at a lower portion 12 of the housing 14 prior to engagement of the filter cartridge 60 onto a respirator 100. In alternative embodiments, the sensor post housing 14 or sensor 20 includes a mechanical connection for attachment to an inhalation valve support of the respirator 100. Alternatively, the sensor post 10 may be fixed to the filter cartridge 60. Desirably, the sensor post 10 may be positioned within the filter cartridge 60 so that the sensors 20 disposed in or on the sensor post 10 can sense conditions in the sorbent bed 62 of the filter and can provide information to a processing device that can use the sensed information to estimate the residual service life time of the filter cartridge.

The sensor post 10 may be received within a cavity formed in the adsorbent bed 62 of a filter cartridge 60 when the cartridge is mounted into the cartridge host 100. With proper mounting of the cartridge, each of the sensor elements 20 on the sensor post 10 is positioned within the bed or adjacent to the bed, thus enabling the sensor elements 20 to detect key operational information regarding the air passing therethrough. Examples of such operational information include contaminant concentration(s) 22, air humidity 26, air temperature 24 and air flow rate 28 at different bed locations. A non-limiting, exemplary listing of gases for which concentration information may be important include formaldehyde, cyclohexane, ammonia, hydrogen sulfide, sulfur dioxide, chlorine, hydrogen chloride and hydrogen cyanide. Information provided by the sensors 20 can be used to provide the user with residual life time and end of service life warnings.

Figure 5:
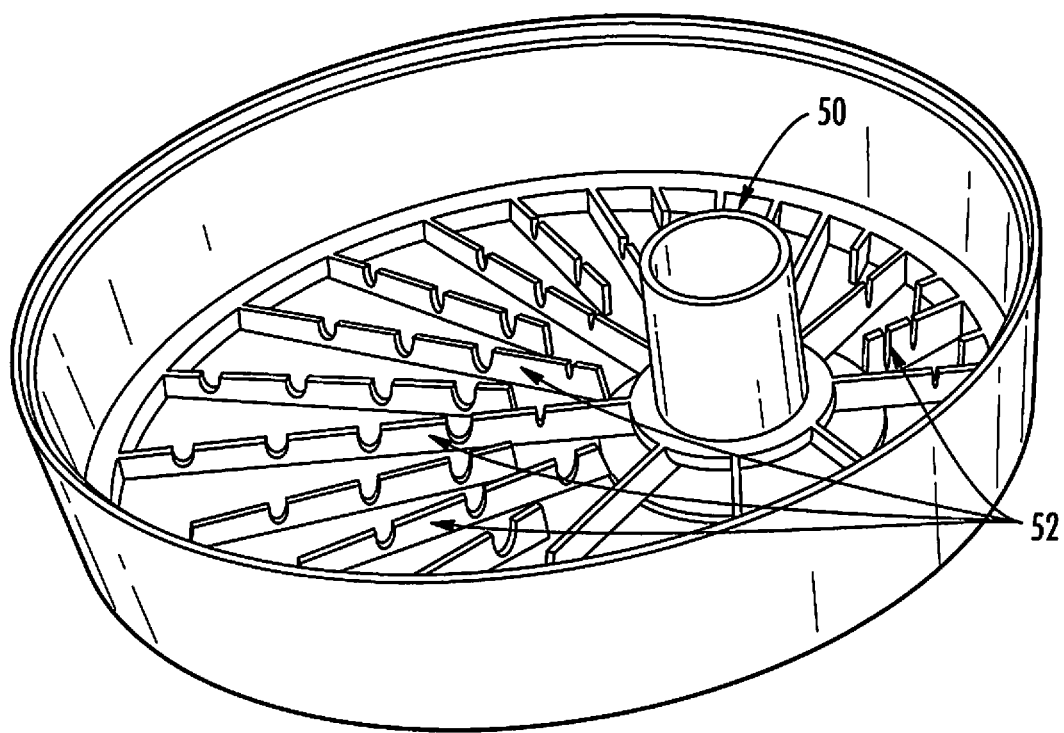
FIG. 5 is an isometric view of an inside portion of an empty filter cartridge showing a receiving structure for receiving the sensor post of FIG. 1A.
Figure 6:
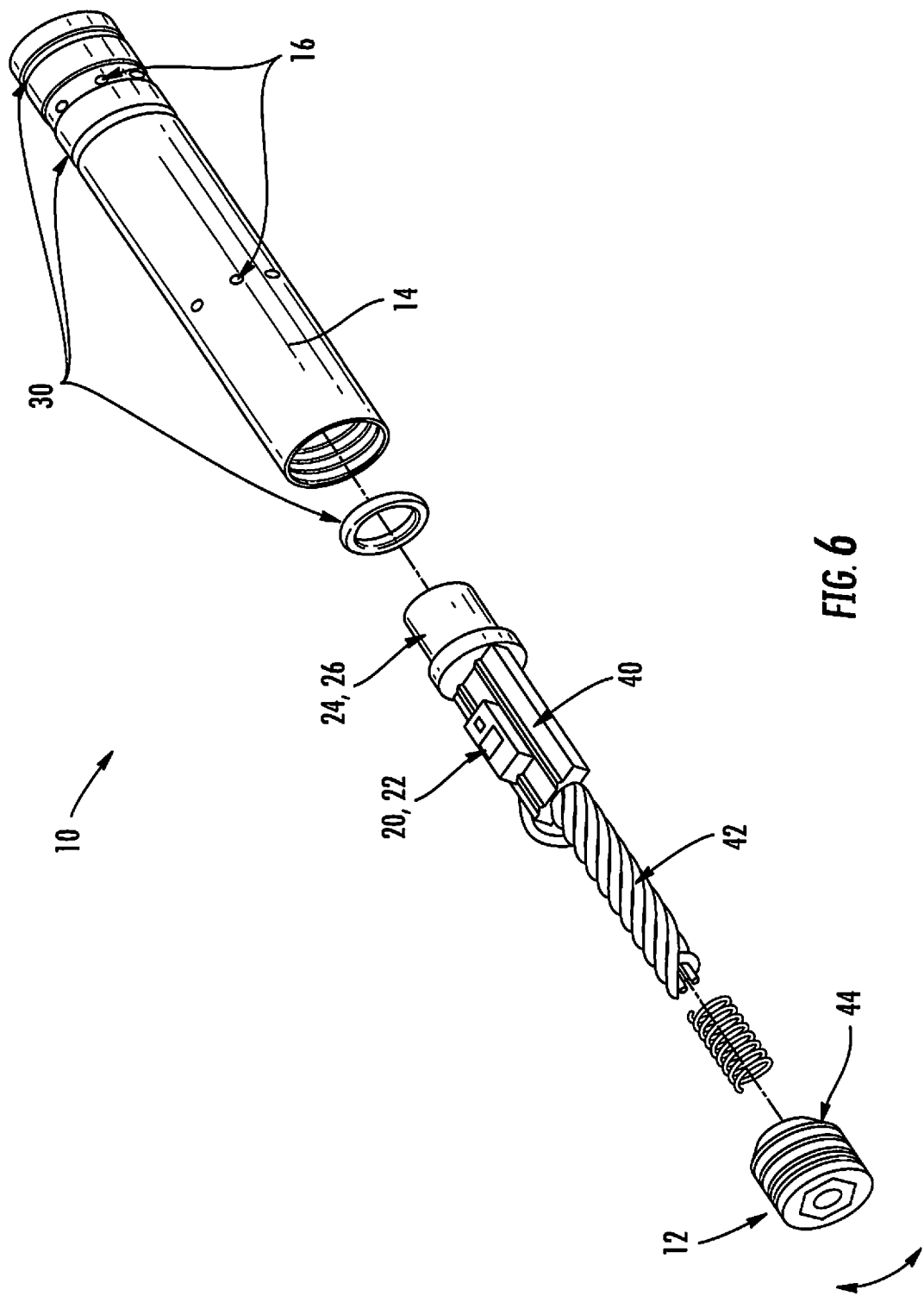
FIG. 6 is an exploded isometric view of the sensor post of FIG. 1A.

As noted, the sensor post 10 can be mounted onto a cartridge host 100 (e.g., a mask, a powered air purifying respirator (PAPR), a cartridge adaptor). In addition, a plurality of sensors 20 can be mounted at different locations on or in the sensor post 10. In one embodiment, the sensor post 10 is inserted into a filter cartridge 60 having a host sensor receptacle, which in one embodiment includes a receiving structure 50, as shown in FIG. 5. It will be appreciated that the described arrangement enables the sensor post 10 to be reused when the cartridge 60 reaches its service life and is discarded. Thus, the cartridge 60 can be disassembled and the sensor post 10 removed prior to discarding the cartridge.

In addition to being insertable/removable in the manner previously specified, the sensor post 10 serves to position the one or more sensors 20 at a variety of desired locations within the sorbent bed 62, thus providing a wider range of information for the calculation of residual life time and end of service life indicator as compared to prior embedded designs. As will be described in greater detail later, the sensor post 10 may also function as a mounting guide to facilitate proper mounting of a cartridge onto a respirator or other host 100 (e.g., mask, cartridge adaptor, or powered air purifying respirators).

As seen in FIGS. 1A, 1B, 2, 4 and 6, the sensor post 10 may include a housing 14, which in the illustrated embodiment is a hollow cylindrical tube. The sensor post 10 may have a plurality of sensors 20 mounted on or in the housing 14 at a variety of locations along the length of the housing. A non-limiting exemplary listing of such sensors 20 includes a humidity sensor 26, a temperature sensor 24, a flowrate sensor 28, as well as an array of chemical sensors 22. Other types of sensors can also be used, as will be appreciated by one of skill in the art.

In one exemplary embodiment, the sensor post 10 has three chemical sensors 22a, 22b, 22c mounted at spaced apart locations along a side wall of the housing 14. In addition, a humidity sensor 26 and a temperature sensor 24 are mounted on a top portion 13 of the post 10 (FIG. 1B), while a flowrate sensor 28 is mounted on the lower portion 12 of the post 10. The sensors 20 may be contained within, and protected by, the sensor post housing 14. Thus, while the sensors 20 themselves may access the environmental and/or toxic conditions outside of the sensor post housing 14 through discrete openings 16 in housing 14, the interior portions of the sensor post 10 are protected from such exposure. The chemical sensors 22 may be isolated from each other by a plurality of sensor seals 30. These seals 30 may comprise appropriate seal members or vapor dams effective to prevent the contaminants from bypassing the sorbent bed 62 along the sensor post wall 14, and to isolate the conditioning board 40 (FIG. 2) and other sensors from chemical contaminants that may corrode the board/sensors and/or adversely affect their operation. In one embodiment, the seals 30 comprise elastomeric o-rings.

Figure 2:
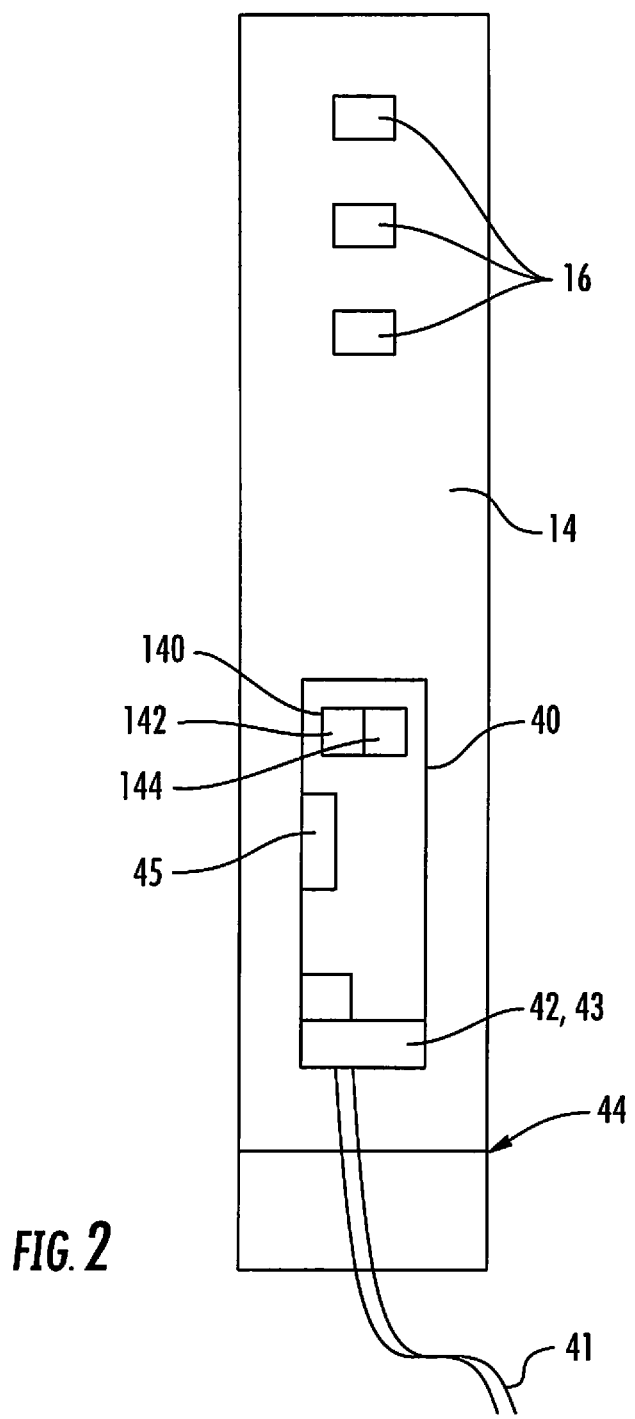
FIG. 2 is cross-section view of the sensor post taken alone line 2-2.

Referring to FIG. 2, a sensor signal conditioning board 40 may be positioned within the housing 14 to function as a sensor conditioner, sensor controller, sensor signal preconditioner for the chemical, humidity, temperature, and flowrate sensors 20 In one embodiment, the signal conditioning board 40 is a printed circuit board. The sensor condition board 40 may control operation of the sensors 20 and may process data received from the sensors 20. For example, and without limitation, the signal conditioning board 40 may control the sensors, may process sensor signals, may execute instructions for calculating residual service life of the associated filter, and may produce signals representative of an end-of-service-life condition of the filter. A power supply 45, either battery or externally provided, may be provided within the housing to power the sensor conditioning board 40.

The signal conditioning board 40 may include one or more microprocessor units 140. Each microprocessor unit may include a microprocessor 142 and associated memory 144. The memory may be volatile, non-volatile, or a combination of both.

In addition, the conditioning board 40 may include any of a variety of analogue signal amplifier and signal filter, digital signal processors, and/or other signal conditioning elements to provide a desired pre-conditioned signal to a monitoring station. In one embodiment, these pre-conditioned signals may be transmitted to a mother unit which contains the proper service life calculation algorithm and which is responsible for providing proper RLI/ESLI warning information to the user. In another embodiment, these signals are read by a local microcomputer or microcontroller unit which is equipped with the proper RLI/ESLI calculation algorithm and which can give out proper RLI/ESLI warnings to the user. The RLI/ESLI calculation algorithm may utilize the proper breakthrough models, such as the one developed by Ding et al, to model the evolution of the contaminant concentration profiles inside the bed, and hence calculate the residual life time of the filter cartridge based on the modeling of the evolution process of the contaminant concentration profiles. This process is different from traditional RLI/ESLI calculation method in that it utilizes relevant adsorption process modeling to predict the RLI/ESLI before any breakthrough event happens. As a result, this method can give out proactive RLI/ESLI information much earlier than the actual breakthrough event, thus giving the user much more time to take according action to avoid potential health damage.

In one embodiment, the host filter or host mask unit 100 comprise the monitoring station and may include a hardwired or wireless receiver and warning information or alarm that can be tripped when an end-of-life condition is approaching. The warning information may take the form of any visual, audio, or mechanical signals that can be noticed and understood by the user. Such warning information may be generated by an electronic unit either mounted on the sensor post body 10 itself, or on a sensor post host unit such as a mask or a PAPR Pre-conditioned signals and/or post conditioned warning signals may take the form of either digital or analog signals or both, and may be transmitted from the sensor post 10 to the host filter/mask via a communication port 42. The communication port 42 may be a hard-wired or wireless communication port for providing a variety of data from (or about) sensor devices 20 to the host filter or host mask unit 100. Thus, in one embodiment, the communication port 42 includes a hard wired connection 41. Alternatively, the communication port may include a wireless transmitter 43 to wirelessly transmit pre-conditioned signals to the host filter/mask 100. Alternatively, or in addition, the conditioned signals may be transmitted (via hard wire or wirelessly) to a separate alarm or monitoring station that is separate from the host filter or host mask unit 100.

The wired or wireless communication port 42 may provide data exchange between the sensor post 10 and any monitoring mother unit mounted on the host filter/mask 100 or other physical units. The warning signals, transmitted via a proper unit and taken any visual, audio, or mechanical form, may convey the information of any of, but not limited to, the following: host filter type, host filter part number, host filter serial number, date of manufacturing, date of expiration, previous usage, residual life time, predicted end of service life time, environmental conditions, critical filter cartridge change out signal, critical immediate evacuation signal, etc.

To protect the inner components, including the signal conditioning board 40, from the gases that may be present within the filter 60 during operation, the sensor post 10 may include a an end seal 44 to seal the interior of the sensor post housing 14 from the environment. In one embodiment, the seal 44 may be an epoxy seal. Alternatively, the seal 44 may be an appropriate gasket or o-ring connection.

As previously noted, the communication port 42 may provide hard-wired or wireless digital communication signals to and from the sensor post 10. Digital communication signals may include, without limitation, model parameters, residual life time data, and end of service life time warning data. The signal conditioning board 40 may include one or more non-volatile data storage memory units 144 to store this and other information, some or all of which may be modified via the one or more associated microprocessors 142.

Figure 3:
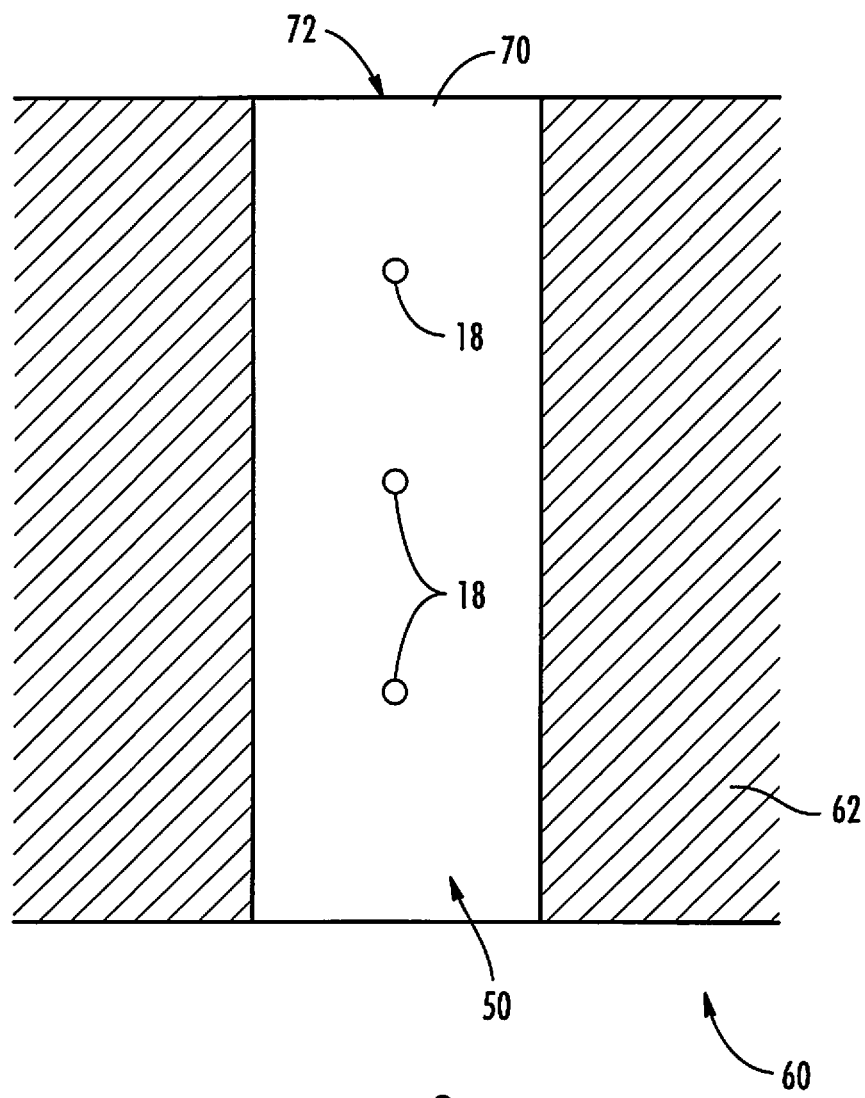
FIG. 3 is a cross sectional view of a filter containing the sensor post of FIG. 1A therein.

Referring to FIG. 3, a cross sectional view of a filter 60 is shown. The filter 60 may include receiving structure 50 (FIG. 5) for holding the sensor post 10 in a desired position with respect to an adjacent sorbent bed 62. The receiving structure 50 may, in one embodiment, form a cylindrical cavity within the sorbent bed 62 and may have one or more sensor orifices 18 disposed in a side wall 70, and/or on a top surface 72. Theses orifices 18 may be positioned directly adjacent the sensors 20 of the sensor post 10 when the post is positioned within the receiving structure 50. The orifices 18 may permit chemical vapor ingress into the cavity so that the chemical vapors can contact the sensors 20 of the sensor post.

In an alternative embodiment, the sensor post 10 may form a cavity in the sorbent bed 62 upon its insertion therein, without the use of a receiving structure. In this embodiment, the sensor post 10 may form a component part of the filter 60. In another alternative embodiment, a cavity may be pre-formed within the sorbent bed 62 of the filter 60. In some embodiments, the sensor post 10 will be attached to a host 100 (e.g., a mask, an adaptor, or a PAPR unit), and then the combination will be engaged with a filter cartridge 60. When a cartridge 60 is mounted onto a host 100 equipped with a sensor post 10, the sensor post 10 is inserted into the sensor post cavity of the cartridge. Where the filter cartridge 60 includes a receiving structure 50 and the cartridge is properly mounted to the host 100, the top 13 of the sensor post 10 will align with top surface 72 of the mounting structure and each of the side sensor orifices 18 will be positioned adjacent respective sensors 20 and will be sealed from each other by adjacent sensor seals 30.

As an alien object intruded into the sorbent bed, the receiving structure 50 may result in certain interference to the air flow pattern inside the sorbent bed and have negative effect on the filter performance. For example, a small fraction of the air flow may creep through the bed along the wall of 50 without fully contacted with the adsorbent material. To prevent this from happening, the receiving structure 50 may be baffled around the contacting surface to block the air flow along the surface of 50. As seen in FIG. 5, which illustrates the interior of an empty filter cartridge in which receiving structure 50 is integrated into the cartridge, a plurality of baffling elements 52 surround the receiving structure 50 to prevent vapor passage through the baffled area.

As shown in FIG. 3, the top surface 72 of the receiving structure 50 can be a screen, or a protective membrane, to protect the top 13 of the inserted sensor post 10 from particulate or liquid contaminants while still allowing vapor to permeate the screen/membrane to contact the sensors 24, 26 disposed at the top of the sensor post 10. In one embodiment, the filter cartridge 60 includes a breakable protective seal element on the opening of the receiving structure 50 to seal the inside of the receiving structure from the outside environment prior to insertion of the sensor post 10. The seal element may be broken by the top 13 of the sensor post 10 when the post is inserted into the receiving structure. This seal allows the filter cartridges that have the sensor post receiving cavity built inside be used on normal air purification respirators on which no sensor post element is installed.

In operation, the signal conditioning board 40 may receive a plurality of signals from the various sensors disposed on the sensor post 10. Thus, the humidity 26 and temperature 24 sensors on the top of the sensor post 10 may provide humidity and temperature signals, while a first chemical sensor 22a may provide site concentration signals at a top portion of the sorbent bed 62. Additional chemical sensors 22b, 22c may provide signals regarding chemical vapor concentration at different sorbent bed levels. Flowrate sensor 28, which may be mounted on a side wall of the sensor post housing 14 adjacent the outlet of the cartridge 60 may provide flowrate signals representative of the rate of air being drawn into the mask 100 or other host structure.

The conditioning board 40 can receive each of these signals and convert them into a desired form (e.g., analog voltage, analog current, digital, digital wireless, or other like transmitting form). One or more of these signals may be processed by the one or more microprocessor units 140 associated with the signal conditioning board 40 prior to transmission to the host filter 60 or other receiver via the communications port 42.

Figure 4:
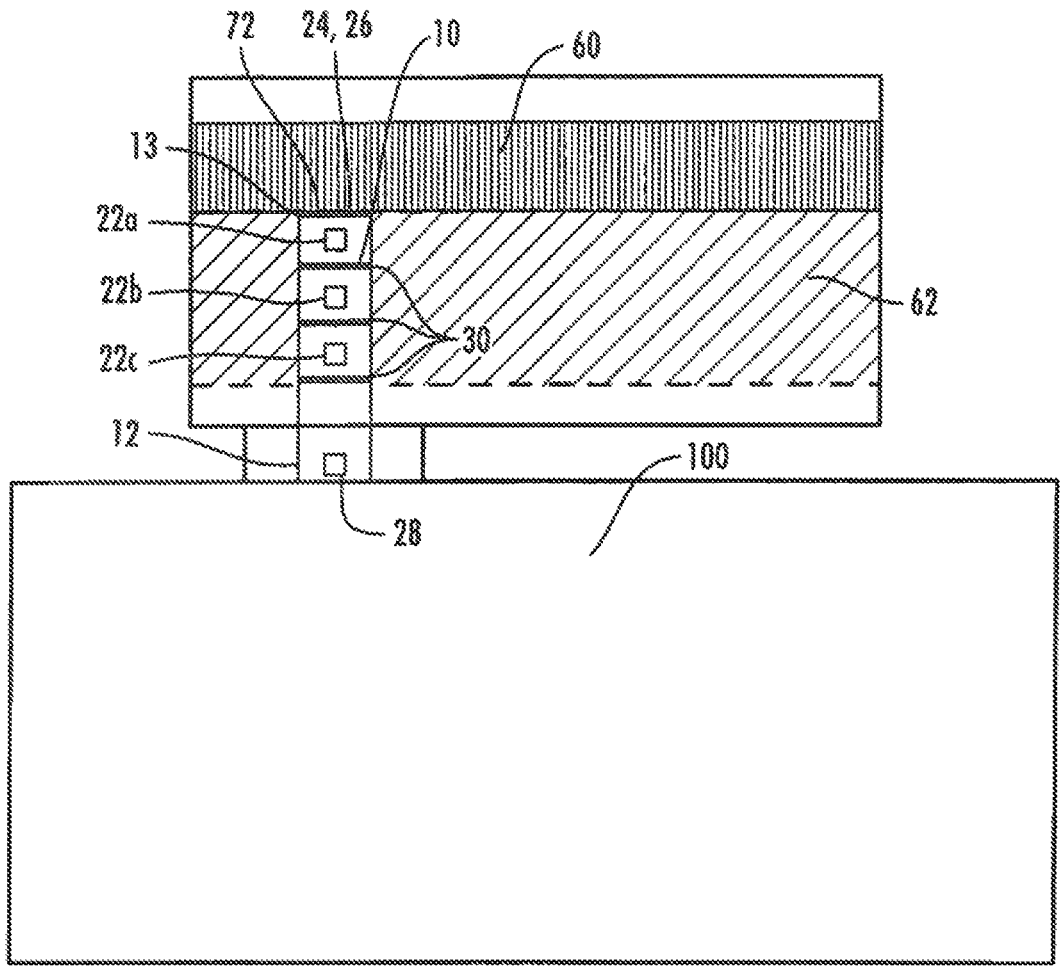
FIG. 4 is a side cutaway view of the sensor post of FIG. 1A inserted into a host cartridge attached to a mask body.

Referring now to FIG. 4, sensor post 10 is shown engaged with a host filter cartridge 60 and a mask body 100. As can be seen, a lower portion 12 of the sensor post 10 engages a portion of the mask body 100 while a top portion 13 of the post is received within the filter cartridge 60. Thus arranged, as the cartridge 60 is mounted onto the host 100, the sensor post 10 can serve as a mounting guide to facilitate the proper mounting of the cartridge 60 on the host 100. In one embodiment, the sensor post 10 may be initially mounted in the filter cartridge 60 and may be inserted into the mask body 100 as the cartridge is mounted to the mask body 100. In another embodiment, the sensor post 10 may be initially mounted in the mask body 100 and may be inserted into the filter cartridge 60 as the cartridge is mounted to the mask body 100.

The sensor post 10 may have one or more chemical sensors, shown as 22a-c as an example embodiment, mounted along the length of the housing 14, pair one or more of humidity and temperature sensors 24, 26 mounted on the top portion 13 of the housing 14, and a flowrate sensor 28 mounted adjacent the lower portion 12 of the housing. Each of the chemical sensor 22a-c may be isolated from the others via a pair of adjacent sensor seals 30. Internal to the sensor post 10 may be a signal conditioning board 40 that functions as a signal pre-conditioner for the chemical, humidity, temperature, and flowrate sensors. Pre-conditioned signals may be transmitted from the sensor post 10 via a hard wired or wireless connection in the manner previously described. The internal volume of the sensor post 10, including the signal conditioning board 40) may be sealed from the surrounding environment by an end cap 44 (see FIG. 6) sealed to the housing 14 using epoxy, or a gasket or o-ring connection.

In one embodiment, the host 100 (e.g., a mask, an adaptor, or a PAPR unit) is equipped with a sensor post 10, and a filter cartridge 60 is provided separately. Thus, when the cartridge 60 is mounted onto the host 100, the sensor post 10 is aligned with the receiving structure 50 of the cartridge 60 to guide the cartridge 60 down into engagement with the host 100. Once the cartridge 60 is properly mounted to the host 100, the top of the sensor post 10 aligns with the top surface 72 of the receiving structure 50. As previously noted, this top surface 72 can be a screen or membrane that allows the temperature and humidity sensors 24, 26 to obtain relevant information regarding the filter during operation. In this position, each of the side sensor orifices 18 is positioned centrally with respect to each of the plurality of chemical sensors 22a-22c, and sealed from adjacent chemical sensors via a pair of associated sensor seals 30.

In one embodiment, the invention includes the sensor device 10 for end of service life indication having the sensor post housing 14 for insertion directly into the sorbent bed 62 of the filter cartridge 60. The housing 14 may be formed to fit within a cavity that has been formed within the sorbent bed 62. The cavity may be pre-formed in the bed prior to insertion of the sensor post housing 14. Alternatively, the cavity may be formed in the bed through the process of inserting the housing 14 in the sorbent bed 62.

In additional embodiments, the housing 14 alone may be provided as a part of the filter cartridge 60, positioned within a cavity in the sorbent bed 62. The internal components of the sensor post 10 may then be inserted into the housing 14 to position the sensors 20 at desired positions within the sorbent bed 62.

As previously noted, the chemical sensors 22a-22c are sealed off from each other via seals 30, which results in individual vapor "chambers" associated with each sensor, and each of the sensors 22a-22c has access to the vapor space within the filter 60 via an associated orifice 18 (see FIG. 3) The individual vapor chambers may be formed by the outer surface of the housing 14, an inner surface region of the receiving structure 50 of the filter cartridge 60, and a pair of seals 30. Alternatively, the chemical sensors 22a-22c may share a common vapor space, allowing a conduit for effective vapor flow therebetween.

In some embodiments, the orifices 18 are positioned such that the maximum concentration level that the chemical sensors are exposed will not be reached at the end of the service life time, in order to protect the chemical sensor from exposing to too high chemical concentration levels to avoid or minimize saturation with contaminant from the environment.

Figure 7:
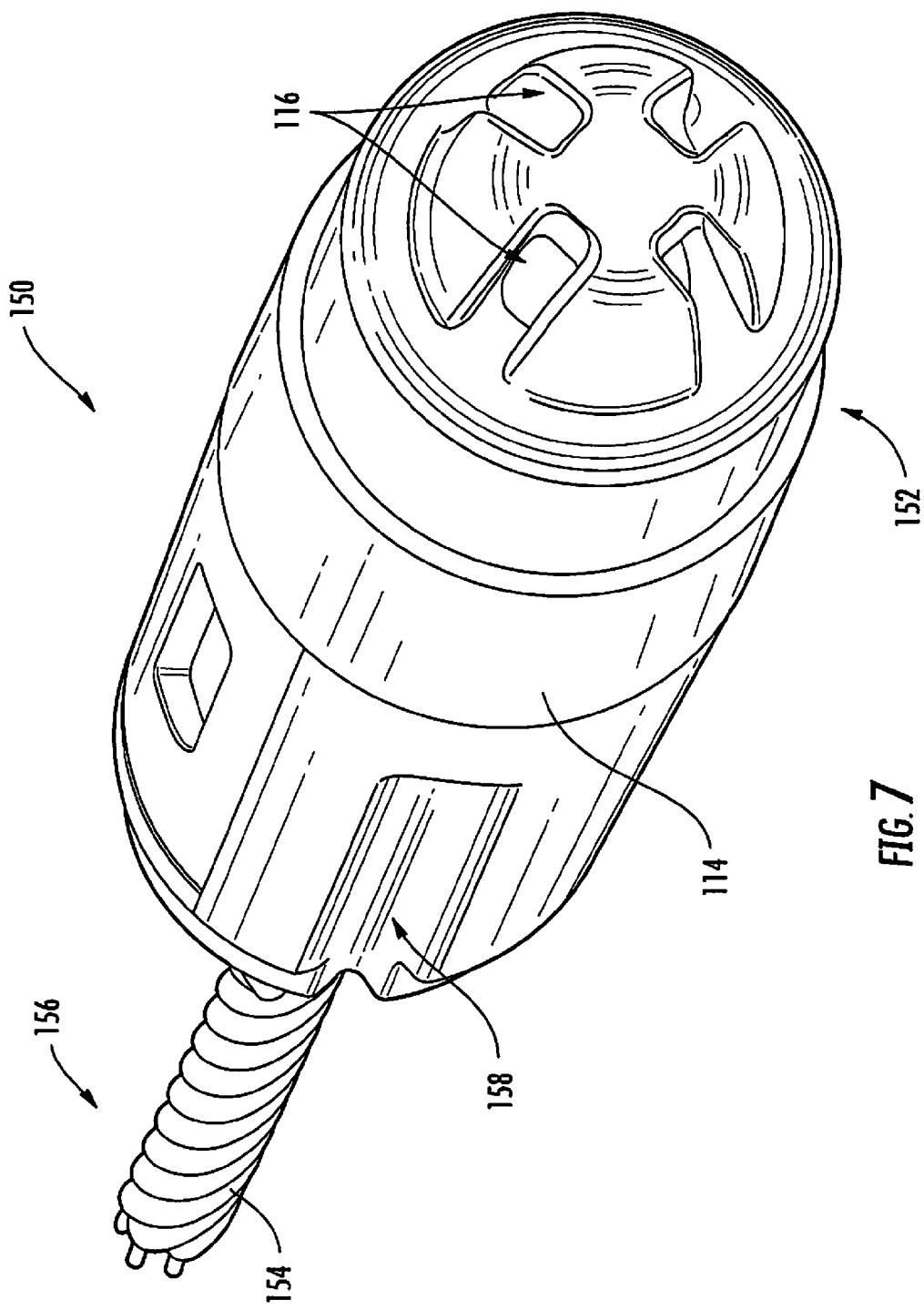
FIG. 7 is an alternative embodiment of the sensor post of FIG. 1A.

FIG. 7 shows an alternative embodiment of a sensor post 150 having an exterior configuration that differs from that of sensor post 100 of FIG. 1A. The sensor post 150 of this embodiment may have any and/or all of the functional features of the sensor post 10 described in relation to FIGS. 1-6. For example, the sensor post 150 may include openings 116 in the housing 114 to enable the sensors disposed within the housing to access the environmental and/or toxic conditions outside of the sensor post housing 114. In contrast to the embodiment of FIG. 1A, the openings 116 of sensor post 150 are positioned at or near the distal end 152 of the sensor post 150. The distal end 152 will be that portion of the sensor post 150 that is positioned within the filter cartridge 60 (see FIG. 4) in use.

The sensor post 150 may also include a communication port 154 disposed at a proximal end 156 of the sensor post 150 to enable signals generated by the sensors disposed in the housing 114 to be communicated to the host filter or host mask unit 100 (see FIG. 4). In the illustrated embodiment this communication port 154 includes a hard wired portion. As with the embodiment of FIG. 1A, the communication port 154 can be hard wired or wireless connection.

Between the distal and proximal ends 152, 156, the housing 114 may include a keyed external geometry 158 for engaging a portion of the mask body 100 to position the distal end 152 of the post within the filter cartridge 60.

As noted, the sensor post 150 of FIG. 7 may include any or all of the features of the sensor post 10 described in relation to FIGS. 1-6. The FIG. 7 embodiment illustrates that the external configuration of the sensor post can take any of a variety of desired external forms.

Figure 8:
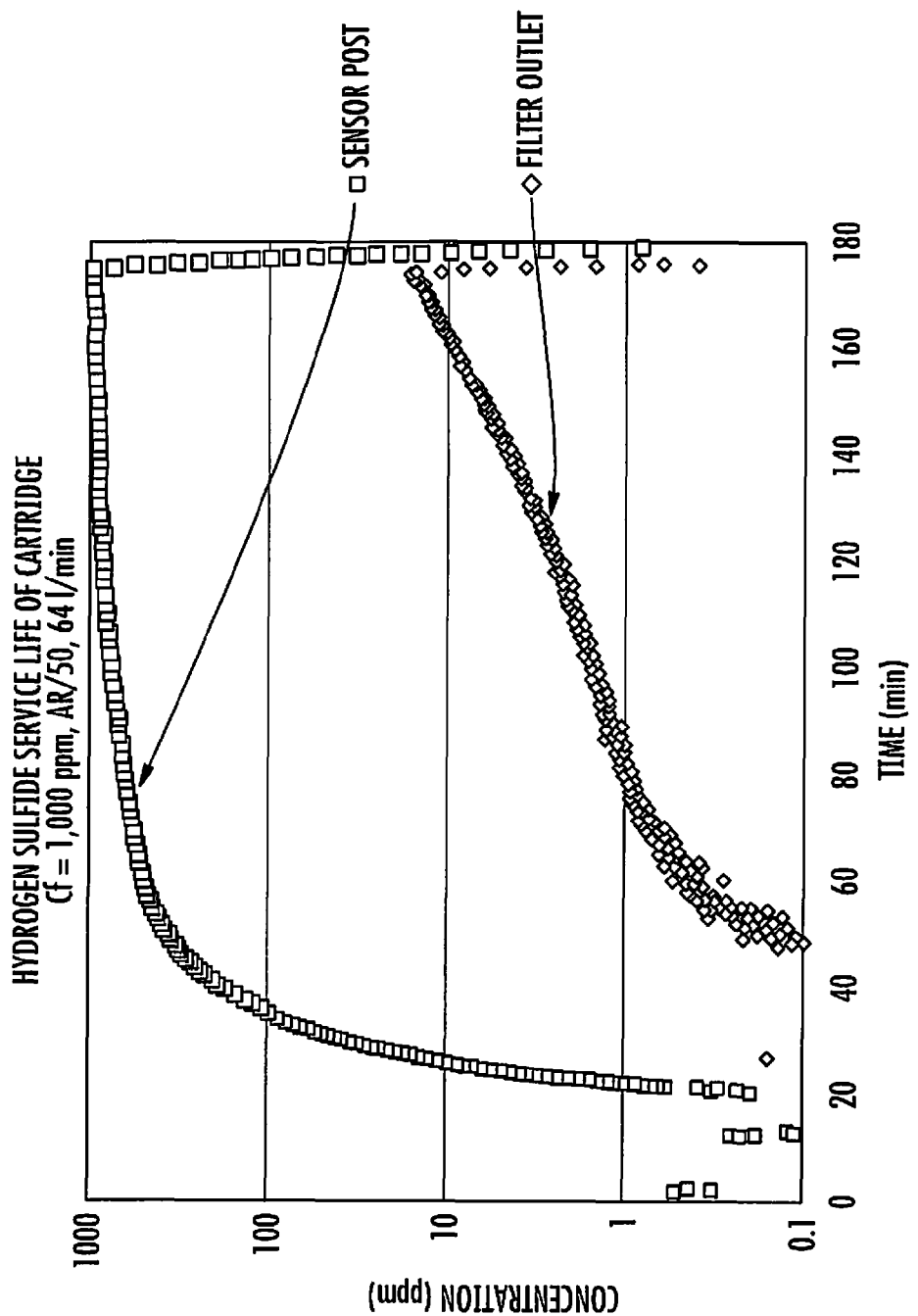
FIG. 8 is a graph of experimental data representative of sensor post performance as an End-of-Service Life Indicator (ESLI) for a hydrogen sulfide filter cartridge.

FIG. 8 is a graph illustrating exemplary experimental data representative of sensor post performance as an End-of-Service Life Indicator (ESLI) for a hydrogen sulfide filter cartridge. The graph is an illustration of hydrogen sulfide gas concentration (in parts per million) vs. time (in minutes), and shows the efficacy of the sensor post in detecting hydrogen sulfide gas prior to filter breakthrough. The sensor detects the presence of chemical prior to a chemical sensor placed at the outlet of the filter. As can be seen, the permissible exposure limit (PEL) for hydrogen sulfide, 10 ppm, is detected at 26.2 minutes which is 137 minutes prior to the time the chemical "breaks through" the filter at this concentration.

Table 1 below shows exemplary laboratory data demonstrating that the sensor post is capable of detecting particular chemicals prior to filter breakthrough, and that filter breakthrough with the sensor post does not degrade more than 11% overall for the chemicals presented. The average breakthrough time of all five experiments is 95.5 minutes without the sensor post, labeled "baseline". The average breakthrough time of all five experiments is 84.8 minutes with the sensor post, labeled "filter outlet". The degradation is less than or equal to 11% as measured by these tests.

TABLE 1

| Chem | RH (%) | Conc. (ppm) | tb, sensor post | tb, filter outlet | tb, baseline |
|---|---|---|---|---|---|
| C6H12 | 50 | 1000 | 10.0 | 47.8 | 65.0 |
|  | 80 | 1000 | 3.0 | 40.2 | 48.2 |
| H25 | 50 | 1000 | 26.2 | 163.3 | 186.8 |
| NH3 | 50 | 1000 | 5.9 | 48.2 | 47.6 |
|  | 50 | 300 | 26.8 | 124.7 | 130.0 |

Figure 9:
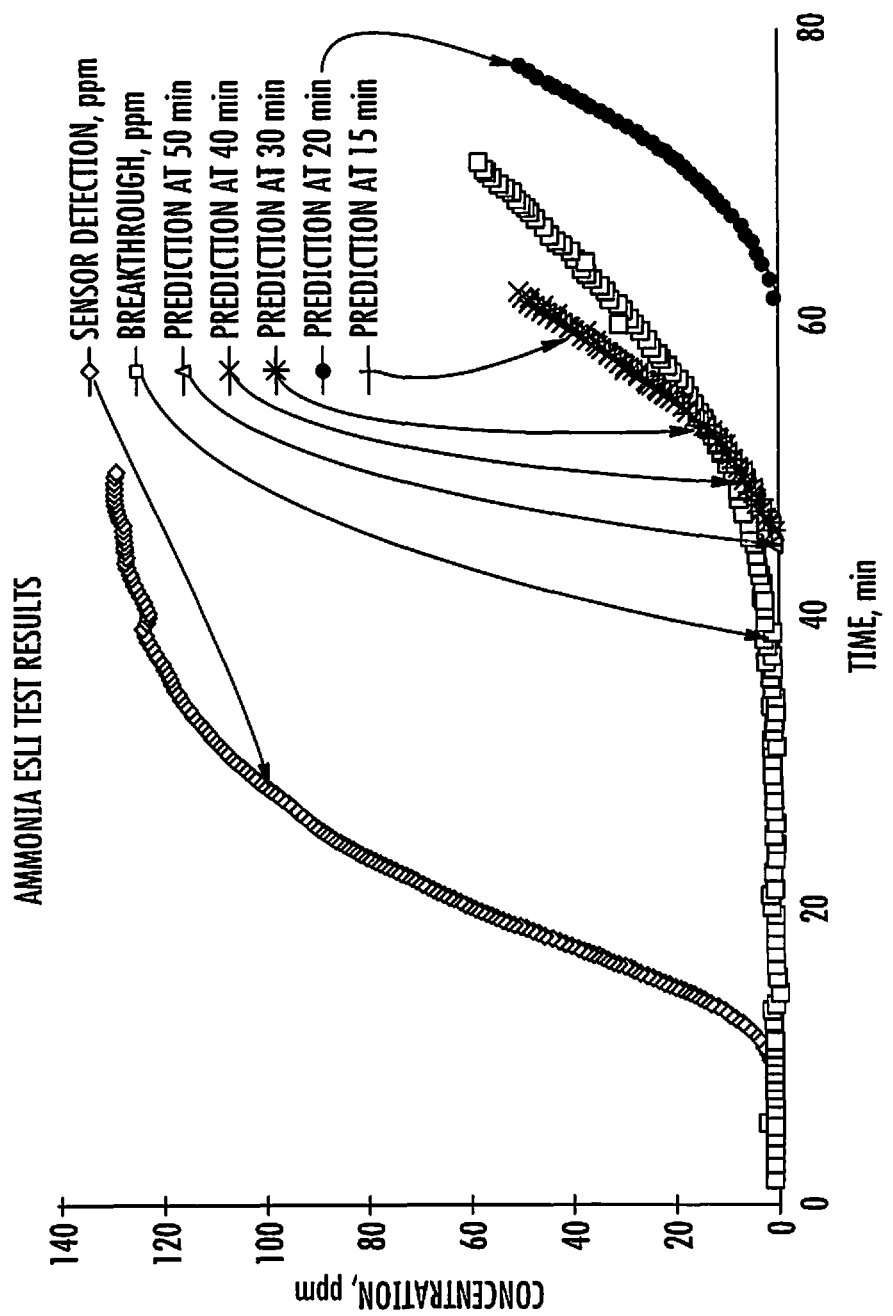
FIG. 9 is a graph of sensor-detected concentration over time, including ESLI prediction at various clock times and measured breakthrough.

Data shown in Table 2 below demonstrate the effectiveness of the sensor post when coupled with an ESLI estimation calculation and the impact of sensor location on prediction accuracy with time. Due to regulatory standards the estimated ESLI should be no more than 90% of the measured ESLI. In all cases presented below, this is the case. ESLI estimation increases with time and is dependent on sensor location. FIG. 9 plots the sensor detected concentration over time, including ESLI prediction at various clock times and measured breakthrough.

TABLE 2

| Chemical | RH, % | Flow, l/min | Location | Parameter | Time (min) | | | | |
|---|---|---|---|---|---|---|---|---|---|
| Ammonia | 50 | 64 | ½ of sorbent bed depth | Clock Time (min) | 20 | 30 | 40 | 50 | |
|  |  |  |  | Estimated ESLI (min) | 74 | 58 | 58 | 58 | |
|  |  |  |  | Measured ESLI (min) |  |  | 62 |  | |
| $H_2S$ | 50 | 64 | ½ of sorbent bed depth | Clock Time (min) | 20 | 25 | 30 | 35 | 40 |
|  |  |  |  | Estimated ESLI (min) | 28 | 36 | 41 | 42 | 42 |
|  |  |  |  | Measured ESLI (min) |  |  | 46 |  | |
| $H_2S$ | 25 | 64 | ½ of sorbent bed depth | Clock Time (min) | 20 | 25 | 30 | 35 | 40 |
|  |  |  |  | Estimated ESLI (min) | 28 | 32 | 34 | 35 | 42 |
|  |  |  |  | Measured ESLI (min) |  |  | 41 |  | |
| $H_2S$ | 85 | 64 | ½ of sorbent bed depth | Clock Time (min) | 20 | 25 | 30 | 35 | 40 |
|  |  |  |  | Estimated ESLI (min) | 30 | 36 | 34 | 50 | 42 |
|  |  |  |  | Actual ESLI (min) |  |  | 47.5 |  | |
| $H_2S$ | 50 | 85 | ½ of sorbent bed depth | Clock Time (min) | 15 | 20 | 25 | 27 | |
|  |  |  |  | Estimated ESLI (min) | 24 | 29 | 35 | 37 | |
|  |  |  |  | Measured ESLI (min) |  |  | 33 |  | |
| $H_2S$ | 50 | 50 | ⅓ of sorbent bed depth | Clock Time (min) | 20 | 40 | 60 | 80 | 100 |
|  |  |  |  | Estimated ESLI (min) | 43 | 70 | 84 | 85 | 82 |
|  |  |  |  | Measured ESLI (min) |  |  | 121 |  | |

The illustrated embodiments are described as utilizing a single sensor post 10 with a single filter cartridge 60. It will be appreciated, however, that more than one sensor post 10 may be used with a single filter cartridge 60. In addition, although a sensor post 10 has been described with a certain arrangement of sensors, it will be appreciated that a variety of different sensor types, configurations and numbers can be used to provide a desired sensing platform. In addition, it is not critical that all sensors provide data to the signal conditioning board at the same rate, nor that all sensors in the sensor post be utilized at the same time. Thus, it is contemplated that a single sensor post may include a plurality of sensors, and that the programming of the signal conditioning board 40 may be such that only certain sensor signals are utilized for a particular filter cartridge application.

The illustrated embodiments are described as a cylindrical body that is inserted into a matching cylindrical hole. It will be appreciated, however, that the sensor device be made into any geometric shape, such as a rectangular or square rod, a hexagonal rod, etc. so long as it can be embedded into the bed and taken out freely without damage to the filter body. Furthermore, depending on the geometry of the object filter, the sensor device may not need to be inserted into a receptacle hole; rather, it can be partially embedded into an receptacle space, or even attached by the side of the filter, as long as the sensors be exposed to the media at a desired bed depth.

Some embodiments of the disclosed method and device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A sensor device for end of service life indication, comprising:
    a housing having an outer surface, a longitudinal cavity, and at least one opening along the outer surface, wherein the housing is removably insertable into a cavity in a sorbent bed of a filter element;
    a sensor for detection of one or more chemicals, the sensor positioned within the longitudinal cavity adjacent the at least one opening;
    a sensor conditioning board for processing sensor data from the sensor;
    a power supply for powering the sensor conditioning board; and
    a receiving structure configured to be positioned in the cavity in the sorbent bed, wherein the receiving structure extends the length of the sorbent bed of the filter element, the receiving structure receiving a portion of the housing therein, wherein the receiving structure includes at least one opening extending from an inside of the receiving structure to an outside of the receiving structure, the opening configured to allow vapor flow from said sorbent bed to the at least one opening of the housing when the housing is placed within the receiving structure.

2. The sensor device of claim 1, wherein the sensor comprises one or more chemical concentration sensors positioned along a length of said housing, each of said sensors associated with an opening in said housing.

3. The sensor device of claim 1, wherein the at least one opening is located at a distal end of the housing away from a mask attachment point.

4. The sensor device of claim 1, further comprising an environmental sensor package within the longitudinal cavity of the housing having at least one sensor selected from the group consisting of a chemical concentration sensor, a temperature sensor, a relative humidity sensor, and a flow rate sensor.

5. The sensor device of claim 1, further comprising an external seal along a circumference of the housing, said external seal for sealing the outer surface of the housing to the receiving structure.

6. The sensor device of claim 1, wherein the sensor comprises a plurality of chemical concentration sensors positioned along a length of said housing, the device further comprising a plurality of seals, at least one of said seals positioned adjacent the outer surface of the housing to isolate the chemical concentration sensors from each other.

7. The sensor device of claim 1, wherein the sensor conditioning board includes a processor and a memory, the processor configured to execute instructions for determining a service life of said sorbent bed of said filter element.

8. The sensor device of claim 1, the receiving structure including a membrane at a top portion thereof for isolating an end of the housing from particulate or liquid contaminants in the sorbent bed, but allowing gas permeation.

9. The sensor device of claim 1, wherein the housing includes a mechanical connection for attachment to an inhalation valve support of a support member of a respirator system.

10. The sensor device of claim 1, wherein the housing includes a mechanical connection for attachment to an inhalation valve support of a mask.

11. The sensor device of claim 1, further comprising a vapor dam for isolating the conditioning board from chemical contaminants.

12. The sensor device of claim 1, wherein the power supply is selected from the group consisting of a battery and an external power source.

13. The sensor device of claim 1, wherein the receiving structure includes a surface proximate to the sorbent bed that is baffled to prevent channeling of vapor contaminants.

14. The sensor device of claim 1, wherein the housing extends from a front portion of the filter bed so that a sensor port is positioned towards an inlet of the sorbent bed.

15. The sensor device of claim 1, wherein the sensor device is configured to transmit information related to residual life time, including but not limited to preconditioned sensor signals and post-conditioned model signals, as an analog electric signal, as a digital electric signal of any form, a mechanical signal, a visual signal, or an audio signal.

16. A sensor device for end of service life indication, comprising:
    a housing having an outer surface, a longitudinal cavity, and at least one opening along the outer surface, wherein the housing is removably insertable into a cavity in a sorbent bed of a filter element;
    a sensor for detection of one or more chemicals, the sensor positioned within the longitudinal cavity adjacent the at least one opening;
    a sensor conditioning board for processing sensor data from the sensor, wherein the sensor comprises a plurality of chemical concentration sensors positioned along a length of said housing;
    a plurality of seals, at least one of said seals positioned adjacent the outer surface of the housing to isolate the chemical concentration sensors from each other; and
    a power supply for powering the sensor conditioning board.

* * * * *

UNITED STATES PATENT AND TRADEMARK OFFICE
CERTIFICATE OF CORRECTION

| | |
|---|---|
| PATENT NO. | : 9,504,859 B2 |
| APPLICATION NO. | : 13/760298 |
| DATED | : November 29, 2016 |
| INVENTOR(S) | : Frank Ding, Amy E. Quiring and Michael Parham |

Page 1 of 1

It is certified that error appears in the above-identified patent and that said Letters Patent is hereby corrected as shown below:

On the Title Page

Item (54) and in the Specification, Column 1, Lines 1-5, change "METHOD AND APPARATUS FOR INTEGRATING CHEMICAL AND ENVIRONMENTAL SENSORS INTO AN AIR PURIFICATION FILTER THROUGH A REUSABLE SENSOR PORT" to --METHOD AND APPARATUS FOR INTEGRATING CHEMICAL AND ENVIRONMENTAL SENSORS INTO AN AIR PURIFICATION FILTER THROUGH A REUSABLE SENSOR POST--.

In the Claims

Column 12, Line 39, in Claim 14, delete "port." and insert --post;--, therefor.

Signed and Sealed this
Twenty-fifth Day of April, 2017

Michelle K. Lee
*Director of the United States Patent and Trademark Office*